(No Model.)
J. W. DAVIS.
CULTIVATOR.
No. 245,610. Patented Aug. 16, 1881.
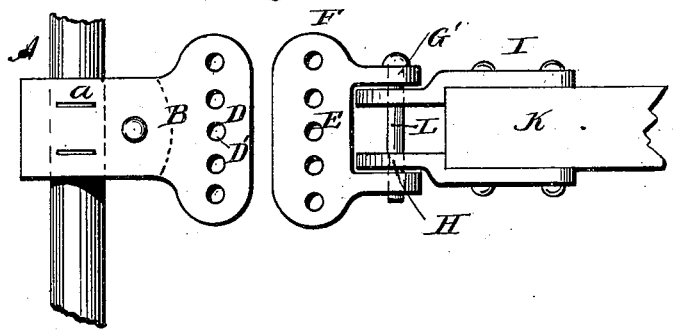
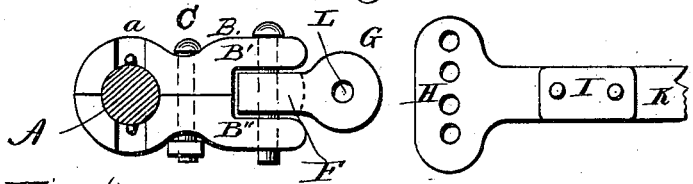
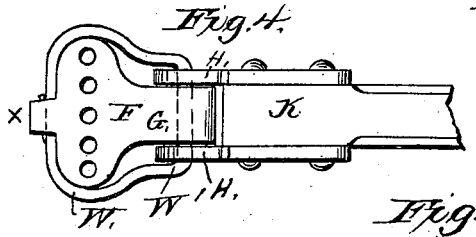
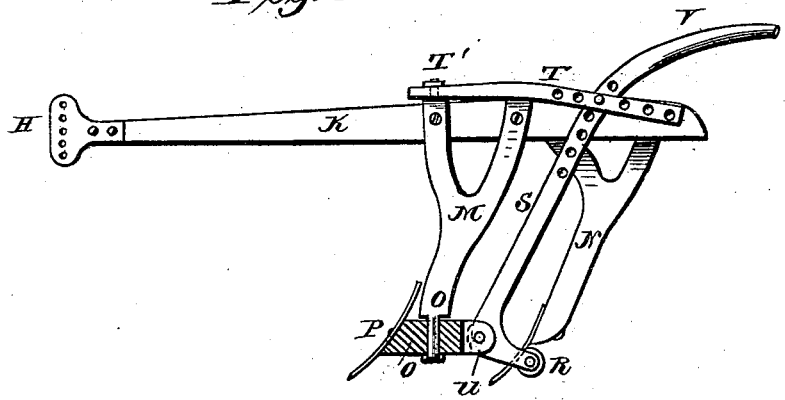
Witnesses:
Franck L. Ourand
H. Aubrey Toulmin
Inventor
John W. Davis,
By Samuel J. Wallace,
Attorney

UNITED STATES PATENT OFFICE.

JOHN W. DAVIS, OF ELVASTON, ILLINOIS.

CULTIVATOR.

SPECIFICATION forming part of Letters Patent No. 245,610, dated August 16, 1881.

Application filed April 7, 1881. (No model.)

*To all whom it may concern:*

Be it known that I, JOHN W. DAVIS, a citizen of the United States, residing at Elvaston, Hancock county, Illinois, have invented a new and useful Improvement in Cultivators, which is made substantially as set forth hereinafter, referring to the accompanying drawings, in which—

Figures 1 and 2 are top and side views of couplings from plow-beam to wheel-frame. Fig. 3 is a side view of plow-beam and parts borne by it. Fig. 4 is a detail of parts varied somewhat from Figs. 1 and 2.

This invention relates to the class of cultivators operating on both sides of a row of plants at one passage; and it consists in improved parts for connecting the plow-beams to the wheel-frame and improved parts borne by the plow-beams.

The plow-beam K is connected to the wheel-frame axle A by a series of parts, B F H, and pivots arranged for a series of adjustments, and for safety.

The clasp B is formed of two parts, B' B'', held together by bolt C firmly on axle A, as shown. It has slots $a$, fitting over a pin on axle A to hold it in place. This clasp B has a space between the two parts in the rear, to receive the end of connecting part F. It has a series of holes, D', for pin D to connect part F. These serve to adjust the width of the two sets of plows apart without altering their mode of running.

The part F has a lateral extension in front, with a series of holes, E, for pin D. These serve to adjust the mode of running of the plows by changing the point of draft in front. This part F has a projection backward, G or G', to connect with clevis H on beam K, as shown in Fig. 4 or Fig. 1. As shown in Fig. 4, it bears a spring, W, held by a clasp, X, and wedge in front. This spring bends backward to clevis parts H on the two sides of the beam K. The ends of this spring W' form projecting pivots to hold in holes in the clevis H, and pass into those in projection G. This is arranged so that when there is too great strain on the plows the pivots W' will spring out and relieve the strain to protect them from breaking. Instead of this a wood pin, L, may be used for the same purpose, as shown in Fig. 1.

The clevis H is formed of two side parts borne by the plow-beam K. These have a vertical extension with a series of holes for pivots W' or pin L. They serve to adjust the depth of running of the plows.

The pin D is formed of wood and arranged to break under great strain, to avoid breaking any part of the apparatus.

The beam K is held by these parts so as to move freely vertically or laterally, with its plows on standards M N, but so as to hold the plows upright in use.

The plow P is mounted on block O, which is mounted on a vertical pivot on standard M so as to turn laterally. This block has a handle, S V, by which it is turned to guide the plow.

Runner U has a wheel, R, on its end, to run on the ground, and is pivoted behind standard M so as to be moved vertically to regulate the depth of plows or throw them out of the ground. It has a handle, S V, by which it is moved and held in place. This handle has a bar, T, pivoted at T', by which it is held at any point by a pin or other means.

Some parts of this invention admit of modifications or equivalents in use.

I claim—

1. The combination, in a cultivator-coupling, of the axle-section B, having the laterally-adjusting holes D', break-pin D, beam-section F, having laterally-adjusting holes E to give straight or side draft to the plow-beam, and the clevis H, having holes for vertical adjustment of the plows, substantially as set forth.

2. The combination, in a cultivator-beam coupling, of the axle-section B and beam-clevis H with a plate or part, F, pivoted to the axle-section and clevis, and adapted to give way under great strain to release the plow-beam and avoid breaking, substantially as set forth.

3. In a cultivator, the combination of plow-beam and standard M with a pivoted block, O, bearing a plow, P, and a handle, S V, whereby the plow may be turned laterally and guided substantially as set forth.

4. In a cultivator, the combination of plow-beam and standard with a vertically-movable runner, U, connected to the standard, and a handle or means of moving and holding the runner at alternative points, substantially as set forth.

JOHN W. DAVIS.

Witnesses:
B. J. KIRKPATRICK,
WM. DOUGLASS.